US012059701B2

(12) United States Patent
Folley

(10) Patent No.: US 12,059,701 B2
(45) Date of Patent: Aug. 13, 2024

(54) CAULK TUBE REPAIR SYSTEM AND APPARATUS

(71) Applicant: Scott Folley, Rockville, MD (US)

(72) Inventor: Scott Folley, Rockville, MD (US)

( * ) Notice: Subject to any disclaimer, the term of this patent is extended or adjusted under 35 U.S.C. 154(b) by 0 days.

(21) Appl. No.: 15/973,458

(22) Filed: May 7, 2018

(65) Prior Publication Data

US 2019/0255559 A1 Aug. 22, 2019

Related U.S. Application Data

(60) Provisional application No. 62/633,406, filed on Feb. 21, 2018.

(51) Int. Cl.
*B05C 17/005* (2006.01)

(52) U.S. Cl.
CPC .. *B05C 17/00509* (2013.01); *B05C 17/00506* (2013.01)

(58) Field of Classification Search
CPC ................ B05C 17/00509
USPC ................ 222/567
See application file for complete search history.

(56) References Cited

U.S. PATENT DOCUMENTS 1,810,091 A * 6/1931 Siegle ................ F16L 13/0209 285/288.1
2,457,908 A * 1/1949 Meyerhoefer .......... A47L 9/244 285/7
2,545,350 A * 3/1951 Fuld .................... B65D 47/261 222/484
2,761,598 A * 9/1956 Darlington, Jr. ....... B65D 47/12 222/541.2
2,953,285 A * 9/1960 McKelvey ........ B05C 17/00516 222/325
3,141,583 A * 7/1964 Mapel ................. A61C 9/0026 222/309
3,537,623 A * 11/1970 Fisher ................. B65D 47/122 222/460
3,915,481 A * 10/1975 Marsh, Jr. ............ F16L 17/035 285/148.23
4,238,059 A * 12/1980 Caraway ............... A61F 5/4405 222/529
4,342,408 A * 8/1982 Boring .................. B65D 25/42 220/378
4,356,939 A * 11/1982 Fitte .................... B65D 47/103 222/541.9
4,382,530 A * 5/1983 Calisto .................. B65D 25/48 222/326

(Continued)

*Primary Examiner* — Paul R Durand
*Assistant Examiner* — Michael J. Melaragno
(74) *Attorney, Agent, or Firm* — Mooney IP

(57) ABSTRACT

A caulk, sealant, or glue tube repair system and apparatus is described. A form-fitting cap, equipped with at least one tip, is disclosed, which is configured to replace the default top and/or tip of a conventional caulk/sealant/glue tube. The apparatus facilitates the effective replacement of the top and nozzle of the tube container such that it may function as-new within a caulk gun. Via replacement of the nozzle/top of the tube container, hardened or dried contents of the container may be removed, providing for continued use of the remaining contents of the tube container. The apparatus is equipped with a nozzle, an air hole, and a tube entry point. The tube entry point is tapered such that it provides a hard seal against the tube container.

6 Claims, 6 Drawing Sheets

(56) References Cited

U.S. PATENT DOCUMENTS 4,703,956 A * 11/1987 Keech ........................ E03F 5/22 285/133.3
4,819,969 A * 4/1989 Williams ................ B25B 27/10 285/148.23
5,029,738 A * 7/1991 Dillon ............... B05C 17/00516 222/215
5,071,042 A * 12/1991 Esposito ................ B65D 25/48 220/711
5,092,498 A * 3/1992 Willems ................. B65D 25/50 222/526
5,104,013 A * 4/1992 Hawley .................. B65D 35/38 222/566
5,137,184 A * 8/1992 Jackson ............ B05C 17/00506 222/327
5,143,408 A * 9/1992 Holtsmark .............. F16L 25/14 285/148.23
5,154,327 A * 10/1992 Long ................. B05C 17/00516 220/375
5,248,071 A * 9/1993 Ray ...................... B65D 47/122 222/566
5,451,214 A * 9/1995 Hajishoreh ............. A61M 5/24 604/234
5,573,147 A * 11/1996 Nilsson .............. B65D 83/0005 222/327
5,582,331 A * 12/1996 Van Moerkerken ......................... B05C 17/00576 222/327
5,833,099 A * 11/1998 Boaz ................. B05C 17/00516 222/568
5,915,594 A * 6/1999 Nakata .............. B05C 17/00586 222/81
6,076,712 A * 6/2000 Esber ................ B05C 17/00516 222/527
6,343,718 B1 * 2/2002 Montenieri ....... B05C 17/00576 222/326
6,435,373 B1 * 8/2002 Mizrahi ............ B05C 17/00583 222/105
6,981,611 B2 * 1/2006 Carruth ............. B05C 17/00516 222/1
7,014,079 B2 * 3/2006 Swann .............. B05C 17/00516 222/326
7,325,995 B2 * 2/2008 Keller .............. A61B 17/00491 222/566
7,337,928 B2 * 3/2008 Jackman ................ B65D 47/10 222/494
7,631,790 B2 * 12/2009 Braams ............. B05C 17/00513 222/527
7,931,175 B2 * 4/2011 Hjort ................. B05C 17/00516 222/527
8,011,538 B2 * 9/2011 Herman .................. B05C 17/01 222/326
D677,535 S * 3/2013 Scott ............................. D8/14.1
8,393,501 B2 * 3/2013 Herman .................. B05C 17/01 222/1
8,740,021 B2 * 6/2014 Naughton ............... G01F 11/00 192/54.5
8,857,672 B2 * 10/2014 Naughton ............... B05C 17/01 222/325
8,991,662 B2 * 3/2015 Milan ............... B05C 17/00506 222/327
9,434,601 B2 * 9/2016 Baker ...................... B67D 7/42
9,901,946 B2 * 2/2018 Ettlin ...................... B05C 17/01
9,920,864 B2 * 3/2018 Forst ..................... F28F 9/0256
2004/0035888 A1 * 2/2004 Chick ............... B05C 17/00503 222/327
2004/0211789 A1 * 10/2004 Osborn ................... B05C 17/01 222/1
2005/0029314 A1 * 2/2005 Williams .......... B05C 17/00516 222/527
2005/0087570 A1 * 4/2005 Jackman ................ B65D 47/10 222/541.4
2005/0133547 A1 * 6/2005 Swann .............. B05C 17/00516 222/566
2006/0049218 A1 * 3/2006 Chick ............... B05C 17/00503 222/566
2006/0091157 A1 * 5/2006 Nomula .................. B05C 17/01 222/326
2010/0135108 A1 * 6/2010 Summons ........... B01F 11/0002 366/208
2013/0112720 A1 * 5/2013 Cross ................... B65D 47/065 222/567
2013/0126558 A1 * 5/2013 Schneider .............. B65D 47/06 222/330
2013/0214013 A1 * 8/2013 Milan ............... B05C 17/00506 222/538
2014/0312068 A1 * 10/2014 Summons ........... B01F 11/0002 222/144.5
2014/0332556 A1 * 11/2014 Summons ........... B01F 11/0002 222/80
2014/0332557 A1 * 11/2014 Summons ........... B01F 11/0002 222/80
2015/0014372 A1 * 1/2015 Proud .................. B65D 47/065 222/567
2016/0066720 A1 * 3/2016 Tanguy ................... A61J 9/006 215/229

* cited by examiner

CAULK TUBE REPAIR SYSTEM AND APPARATUS

CONTINUITY

This application is a non-provisional patent application of provisional patent application No. 62/633,406, filed on Feb. 21, 2018, and priority is claimed thereto.

FIELD OF THE PRESENT INVENTION

The present invention relates to the field of container repair, and more specifically relates to a system and apparatus which facilitates rapid repair of a caulk, sealant, glue, or other tube container conventionally dispensed via a caulk gun.

BACKGROUND OF THE PRESENT INVENTION

It is known that tube-shaped containers exhibit an effective means for dispensing semi-solid substances, such as caulks, sealants, glue, and other similar materials. Conventionally, such tube-shaped containers include a sliding rear portion which is pushed by a caulk gun component, whereby the contents of the tube-shaped container is pressed/pressurized. The pressurized contents are then forced into a nozzle which is usually attached to a front of the tube-shaped container. Commonly, in order to open such a tube-shaped container, a user must cut or otherwise puncture a tip of the nozzle to allow the contents to exit the container via the nozzle.

Often, after use of such a tube-shaped container to accurately apply a sealant, caulk, or glue, the tube-shaped container is stored with the intent of additional use at a later time. However, with even minimal exposure to the air or moisture, many glues, sealants, and caulks become hardened within the nozzle of the tube-shaped container, rendering the nozzle inoperable. Determined individuals are known to drive a screw into the nozzle in an attempt to free-up the hardened contents such that the remaining portion of the contents may be used. Similarly, other individuals may try to drill-out the hardened portion, but this often has mixed results. Other users are known to puncture the end of the tube-shaped container itself, or to cut off the entirety of the front end of the container to allow for manual removal of the contents with a finger or small scraper.

Removal of the contents in such a manner is often messy, and is not effective at evenly distributing the contents, such as when caulking tile or sealing a shower. If there were a way to replace the default nozzle of a tube-shaped container such that the hardened portion is easily removed, users could employ the remainder of the contents of the container without the need to puncture the tube, use a drill, or use a screw to remove the hardened portion of the contents.

Thus, there is a need for a new form of replacement nozzle and cap for a tube or cylinder-shaped container such as those conventionally used to hold and dispense caulks, glues, and sealants. Such an apparatus preferably embodies a tube-shaped container repair system which facilitates rapid and painless repair of any conventional caulk, sealant, or glue container via the effective replacement of the front cap and nozzle of the tube-shaped container. This effective repair enables use of the remainder of the contents of the tube-shaped container without the need to use one's fingers to apply the contents.

Some caulk/solvent/glue 'savers' are present on the market, however most are designed in an attempt to seal the tube-shaped container in the hopes of preventing air from causing the substance to dry and harden within the nozzle. These systems are effective if the tube-shaped container is not stored for a long period of time. However, unlike the present invention, they are often configured to slide within the output hole of the default nozzle as a plug. Unfortunately, the plug then becomes hardened into place within the nozzle, which must then be dislodged by force or puncture.

A few attempts at solving this issue can be found in the prior art. For example, U.S. publication number US2006/0049218A1, filed by Chick on Apr. 9, 2009 is for a Replacement Caulking Tube Nozzle. Chick teaches a caulking tube nozzle having a nozzle portion, integrally formed with a base. However, the invention taught by Chick is configured to slide within the tube container, and is not malleable so as to be functional with both metallic tube containers, cardboard tube containers, and composite tube containers. This is unlike the present invention, which is configured to seal around the outside of the tube container (rather than be inserted within the tube container). In contrast to the invention taught by Chick, the present invention is equipped with adapters to facilitate use on metallic tube containers (which often have a slightly smaller diameter than those composed of cardboard), and has a tapered neck to facilitate a tight seal around the outside of any tube container.

U.S. Pat. No. 7,014,079B2, filed by Swann on Dec. 23, 2003 is for a 'Caulking Tube Replacement Tip.' While the invention taught by Swann appears similar to that of the present invention, Swann solely teaches the implementation and installation of a replacement tip for the tube container, which is ineffective if the entirety of the front portion of the contents of the tube container have hardened. As such, the invention taught by Swann is ineffective in the event that the entirety of the top of the tube container must be cut off, unlike the present invention. Additionally, the invention taught by Swann is incompatible with multiple sizes of tube containers, as well as multiple types of tube containers having differing material compositions (metal, cardboard, plastic, etc.), unlike the present invention which may be used on different sizes and types of tube containers.

U.S. Pat. No. 4,382,530A, filed on Jul. 1, 1981 by Calisto is for an Interchangeable Nozzle Apparatus. The invention taught by Calisto is configured for use on a tube container such as a caulk tube. However, unlike the present invention, the invention taught by Calisto is configured to merely replace and/or slide atop of the default nozzle of the tube container. In contrast, the present invention is configured to completely replace the entire front or top portion of the tube container after it has been severed or removed via a cutting instrument. In short, the present invention is configured to facilitate continued use of a partially used tube container, whereas the invention taught by Calisto is configured to change the output (weight, diameter, or viscosity) of the contents of the tube container, and is not helpful in the continued use of a partially dried and used tube container (in which the contents of the tube container have dried within the tube container, rendering the default nozzle useless).

SUMMARY OF THE PRESENT INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is a repair system and apparatus for tube-shaped containers, configured for use on conventional cylindrical or 'tube-shaped' containers often known to contain caulks, glues, or similar sealants. The present invention consists of a body having a nozzle and a wide end. The wide end is configured to fit securely over and around the front end of a tube-shaped container. An air hole or 'vent' is preferably disposed at a tip of the nozzle to facilitate the escape of air when the body of the present invention is installed to the tube-shaped container. Post-installation of the apparatus of the present invention, the tube-shaped container may be used in a conventional fashion via the use of a caulk gun.

Some embodiments of the present invention may be configured to accept differing nozzles having differently shaped, angled, and sized tips. In such embodiments, the tips are interchangeable by screwing on/off the tip in use, and replacing it with a different tip. The ease of removal of the nozzle/tip facilitates cleaning of the apparatus when needed. As such, it is envisioned that some embodiments of the present invention may be reused on different tube-shaped containers after cleaning. However, some users may wish to only use the present invention once before disposal.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
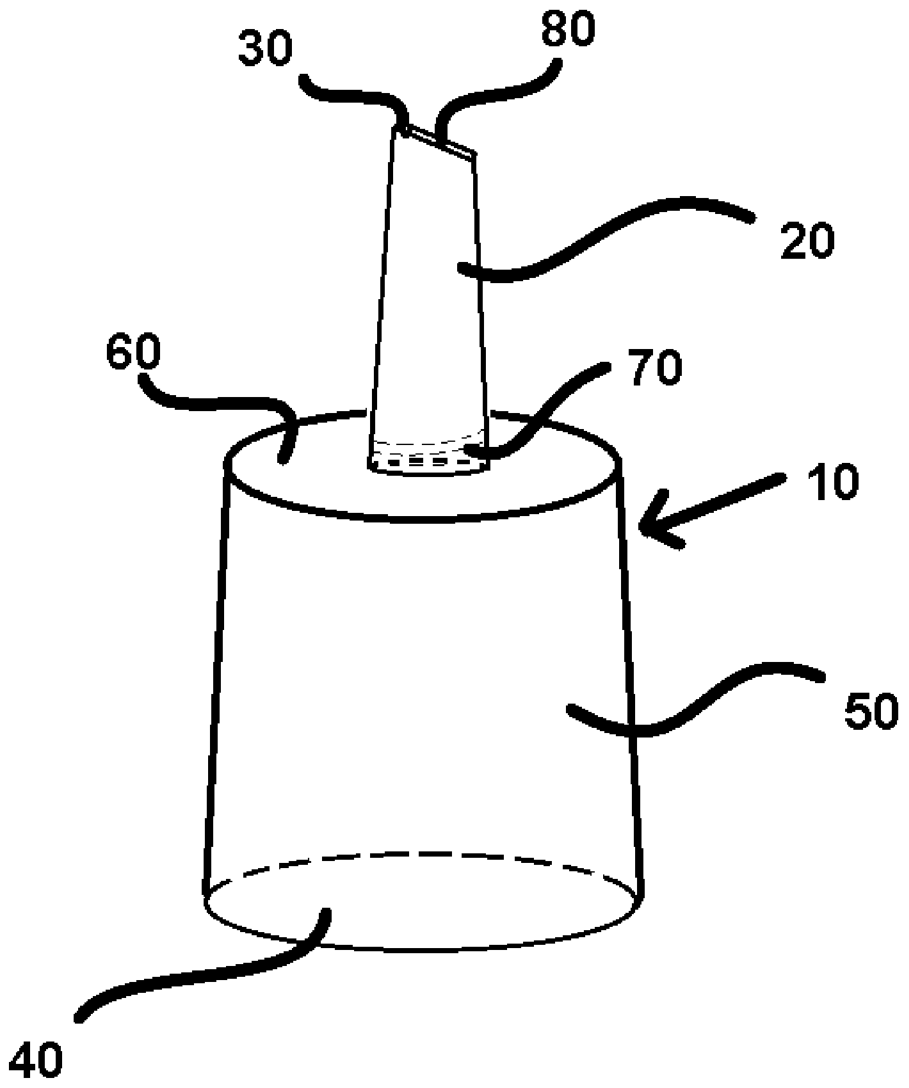
FIG. 1 depicts a view of the preferred embodiment of the apparatus of the present invention as seen from the side.
Figure 2:
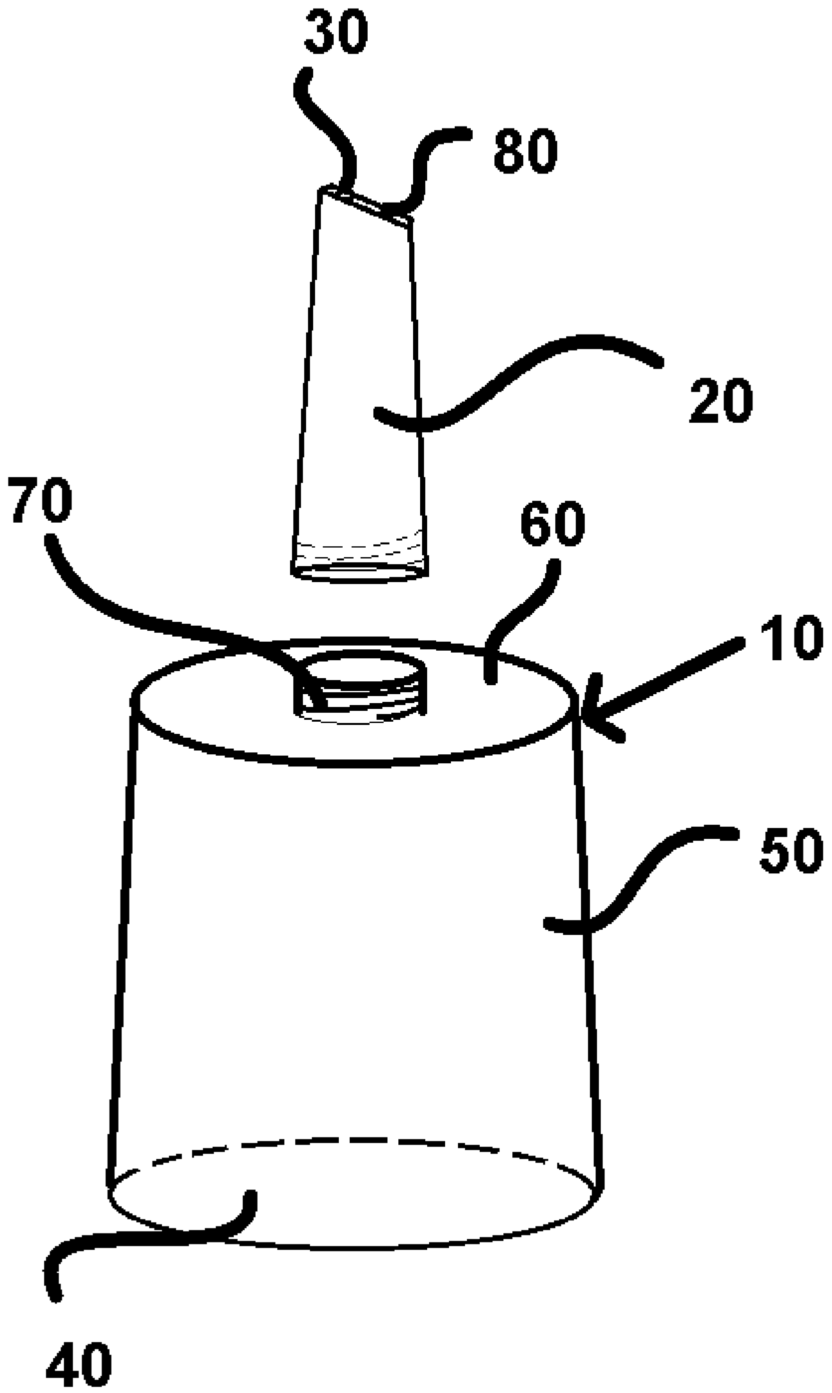
FIG. 2 shows a side view of the present invention depicting the nozzle separated from the threaded receptacle of the front end of the present invention.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a tube container repair apparatus and system configured for use atop tube containers often containing caulk, sealant, or glue. The present invention is equipped with a body (10), at least one nozzle (20), a tip (80), a vent hole (30), and a wide opening (40). The body (10) is equipped with a neck portion (50) which extends from the at least one nozzle (20) to the wide opening (40). The vent hole (30) is preferably disposed on the nozzle (20) to make it easy to install the apparatus to the tube-shaped container without causing airlock. The vent hole (30) is small such that it does not affect the application of the product (contents of the tube container). As such, the vent hole (30) is simply designed to prevent difficulty in the initial installation of the present invention to the tube container. The apparatus of the present invention is configured to mate to the dispensing end of a tube container containing caulk, sealant, glue, or similar substance conventionally applied via a caulk gun.

The present invention is a tube container repair apparatus and system configured for use atop tube containers often containing caulk, sealant, or glue. The present invention is equipped with a body (10), at least one nozzle (20), a tip (80), a vent hole (30), a wide opening (40) strait portion (210), a first tapered portion (200), and a second tapered portion (190). The body (10) is equipped with a neck portion (50) which extends from the at least one nozzle (20) to the wide opening (40). The vent hole (30) is preferably disposed on the nozzle (20) to make it easy to install the apparatus to the tube-shaped container without causing airlock. The vent hole (30) is small such that it does not affect the application of the product (contents of the tube container). As such, the vent hole (30) is simply designed to prevent difficulty in the initial installation of the present invention to the tube container. The apparatus of the present invention is configured to mate to the dispensing end of a tube container containing caulk, sealant, glue, or similar substance conventionally applied via a caulk gun.

The wide opening (40) of the present invention is configured to mate with the tube container itself, sliding over and onto the open portion of the tube container. As such, the wide opening (40) acts as a female connection, accepting a portion of the tube container such that the end of the tube container is disposed against a front end (60) of the body (10) of the present invention. The neck portion (50) preferably tapers outwards towards the wide opening (40) to facilitate a tight seal against a rim of the tube container during installation of the present invention to the tube container. A rim of the wide opening (40) is preferably beveled to facilitate installation of the apparatus onto the tube-shaped container. The inner diameter of the wide opening (40) is preferably 1.97 inches. The inner top diameter of the neck portion (50) of the present invention is also critical, as it facilitates the seating of rigid metal or metallic-based tube containers onto the present invention. As these metal tube containers are much more rigid than plastic or cardboard tube containers, they are therefore less forgiving, and require a firmer seal as detailed below.

The angles present in the tapering of the neck portion (50) of the present invention are critical, as they facilitate the maximization of surface-to-surface contact between the tube container and the present invention. The tapering angle of the neck portion (50), (210) is configured to slightly flex plastic and cardboard tube containers as the tube container is seated within the wide opening (40) of the present invention. The length of the neck portion (50) is critical to the functionality of the present invention, as it provides for the best surface-to-surface contact.

The following dimensions of the preferred embodiment of the present invention are subject to change, but current testing shows the following dimensions to be the optimum, to best accommodate plastic, cardboard, and metal tubes with varying outside diameters and material thickness. These dimensions are also to create the best retention of, and seal to, the tube container.

The external length of the neck portion (50), without the nozzle (20) and tip (80), is preferably two inches. The opening of the mouth (referenced as the wide opening (40)) is preferably 1.97 inches. The inside diameter at the top of the neck portion (50) is preferably 1.80 inches in order to fit metal tubes. The wide opening (40) of the neck portion (50) (also referenced as the body) preferably maintains a 1.97 inch inner diameter for 0.5" into the body (210). This 0.5" provides stability on the tube container. The inner diameter of the neck portion (50) then tapers to 1.85" (inner diameter) over a distance of one inch, (200). The last ~0.3" tapers from 1.85 inches (190) to the top inner diameter of 1.80 inches. The function of the longer taper cited is to obtain the best retention and seal of the present invention to plastic and cardboard tubes, while the shorter taper is for sealing and retention of the present invention to metal tubes (as the metal tube containers are generally ~0.1-0.15" smaller in diameter and more ridged than the plastic and cardboard tube containers).

Figure 4:
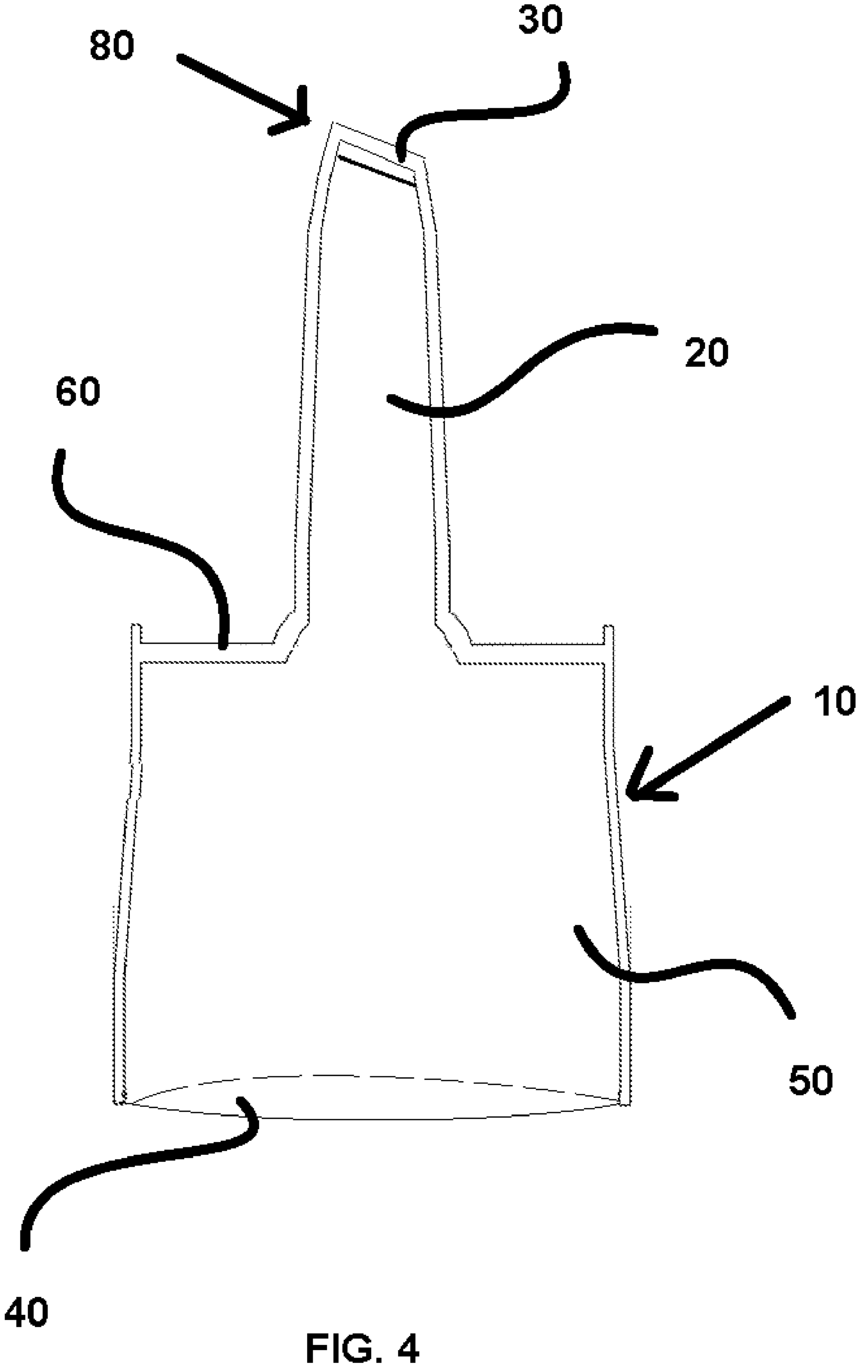
FIG. 4 depicts a view of the preferred embodiment of the present invention as shown from the side, shown with ridges and a single circular vent hole showing.
Figure 5:
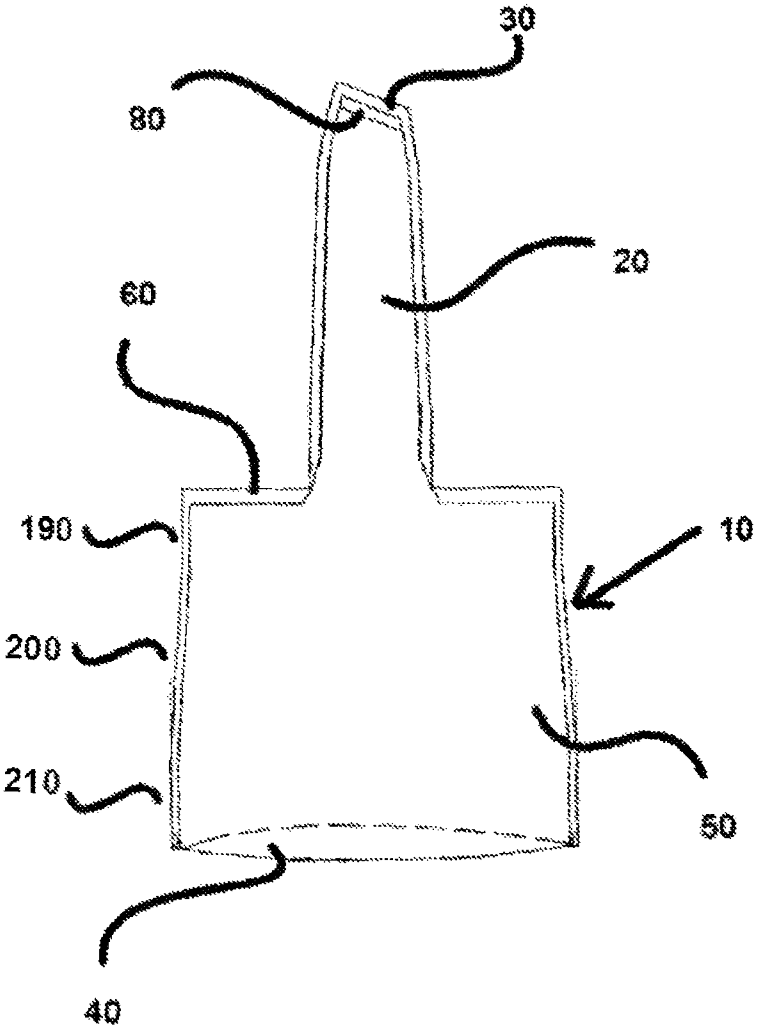
FIG. 5 shows a view of an alternate embodiment of the present invention as shown without ridges and a single slotted vent hole.

The ridge disposed on the top of the present invention, as depicted in FIG. 4, is preferably not present in the preferred embodiment of the present invention in order to reduce the length of the assembled tube and device, as depicted in FIG. 5. This is to minimize the need to trim the back of the tube container before inserting the assembled invention and tube container into the caulk gun.

It should be understood that the present invention is configured to replace the nozzle and/or front cap of the tube-shaped container, which is especially prudent in scenarios in which the tube container has been previously opened and partially used, then stored. In storage, the contents of such tube containers often hardens and/or solidifies, making continued use of the contents of the tube container at a later time difficult or even impossible. Proper use of the apparatus of the present invention enables users to retrieve and use the remaining contents of such tube-shaped containers (which are presently often discarded), saving the user money. Additionally, the user's time is saved via use of the present invention, as rather than trying to drive a nail, screw, or drill bit into the default nozzle of the tube-shaped container in an attempt to break up the hardened contents lodged in the nozzle (20) and/or tip (80), the user may simply replace the entirety of the top of the tube-shaped container with the apparatus of the present invention—a much faster procedure.

Figure 3:
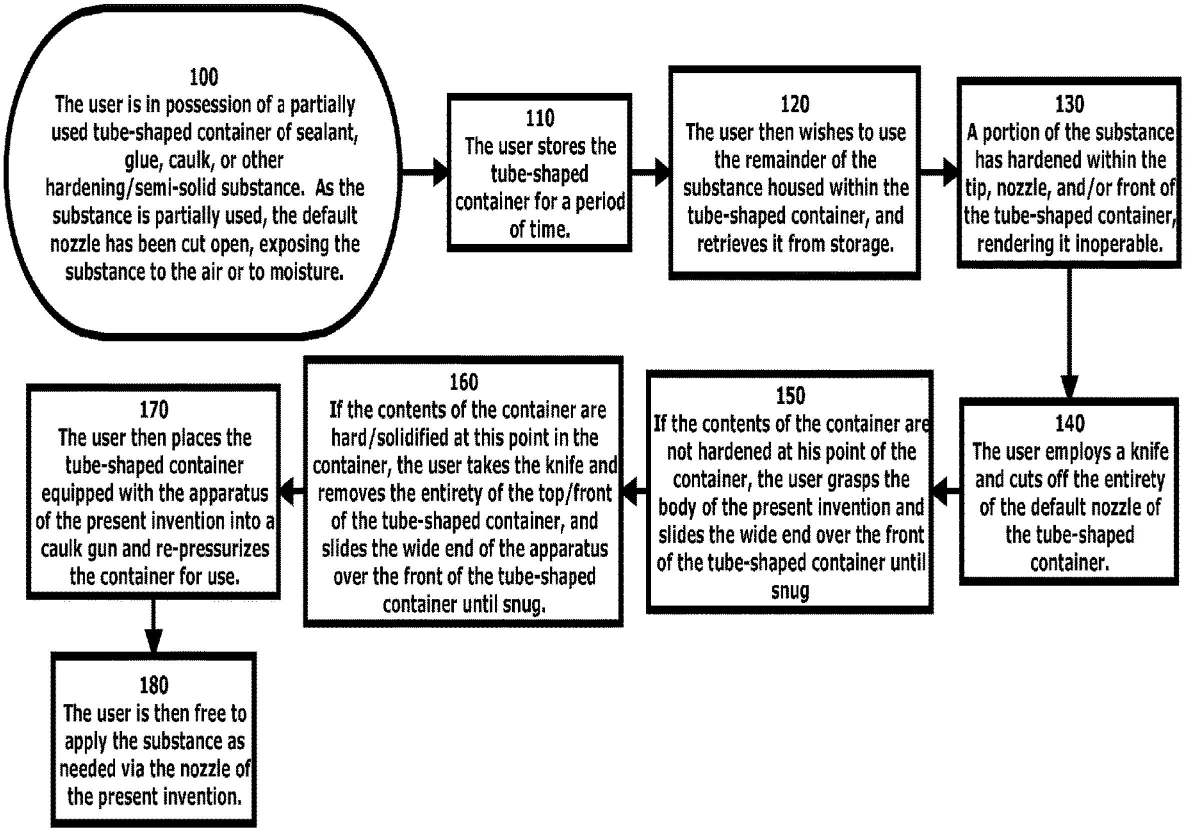
FIG. 3 exhibits a flow-chart detailing the process of use of the present invention.

The process of use of the present invention, as depicted in FIG. 3, is preferably as follows:

1. The user is in possession of a partially used tube-shaped container of sealant, glue, caulk, or other hardening/semi-solid substance. As the substance is partially used, the default nozzle has been cut open, exposing the substance to the air or to moisture. (100)

2. The user stores the tube-shaped container for a period of time. (110)

3. The user then wishes to use the remainder of the substance housed within the tube-shaped container, and retrieves it from storage. (120)

4. A portion of the substance has hardened within the tip, nozzle, and/or front of the tube-shaped container, rendering it inoperable. (130)

5. The user employs a knife and cuts off the entirety of the default nozzle of the tube-shaped container. (140)

6. If the contents of the container are not hardened at his point of the container, the user grasps the body of the present invention and slides the wide end over the front of the tube-shaped container until snug. (150) If the contents of the container are hard/solidified at this point in the container, the user takes the knife and removes the entirety of the top/front of the tube-shaped container, and slides the wide end of the apparatus over the front of the tube-shaped container until snug. (160) It should be understood that the air vent of the nozzle facilitates installation of the apparatus without causing airlock.

7. The user then places the tube-shaped container equipped with the apparatus of the present invention into a caulk gun and re-pressurizes the container for use. (170)

8. The user is then free to apply the substance as needed via the nozzle of the present invention. (180)

Figure 6:
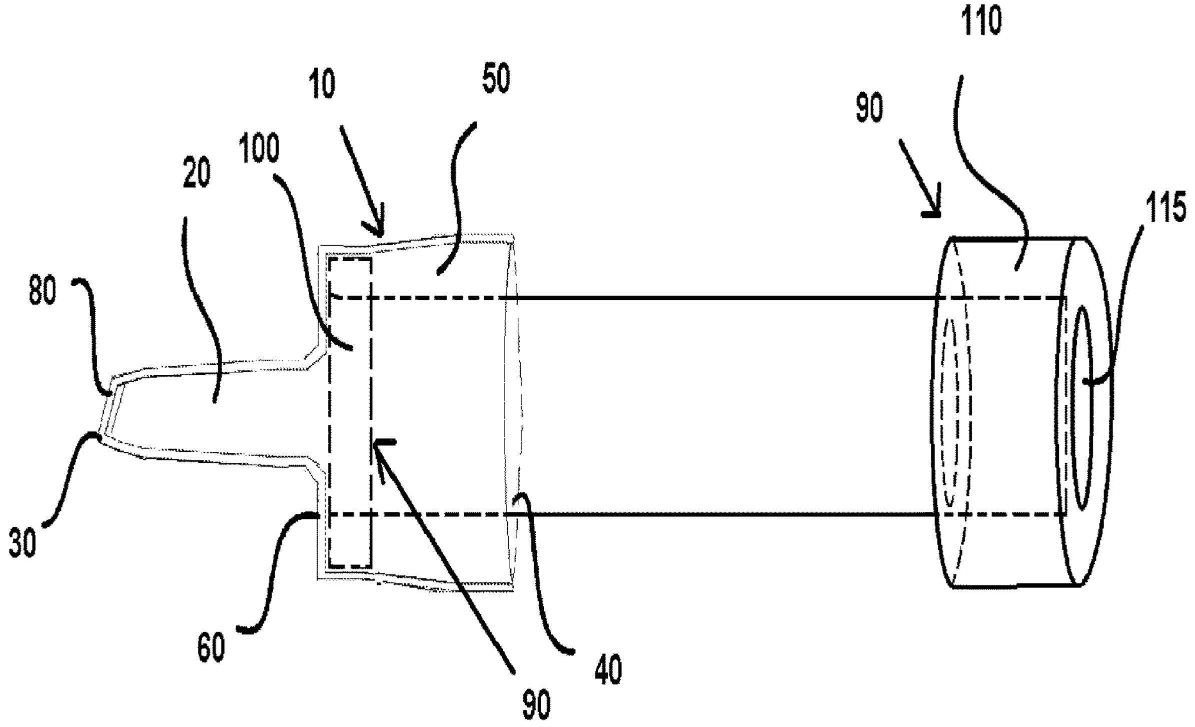
FIG. 6 depicts a view of the at least one adapter of the present invention as seen from the top.

Some embodiments of the present invention are preferably equipped with at least one adapter (90) which is configured to facilitation installation of the present invention onto differently sized tube containers, such as those with smaller diameters. The at least one adapter (90) preferably includes a top adjuster ring (100) and a bottom adjuster ring (110) as shown in FIG. 6, which are configured to attach to the top and bottom of the tube container respectively. The at least one adapter (90) enables a user to use the primary embodiment of the present invention with a smaller tube container while employing the standard size caulk gun. As such, the at least one adapter (90) is configured to effectively enlarge the top and bottom of a smaller tube container, making it function as though the tube container was a standard sized tube container (as some metallic tube containers are slightly smaller in diameter than those composed of cardboard or similar composite). The bottom adjuster ring (110) is equipped with a central plunger hole (115) for placement of the standard plunger extension of a caulk gun which is used to push the contents of the tube container towards the tip, and must continue to extend into the tube container as the contents are emptied.

Additionally, it should be noted that the present invention can enable a truly reusable tube container, as when the top is severed from the standard store-bought tube container, and is replaced with the apparatus of the present invention, in conjunction with the at least one adapter (90) of the present invention, the tube container may be feasibly reused for multiple application, including one or more refillings of the tube container by the end consumer.

It should be understood that the present invention may be composed of a variety of materials, including, but not limited to acrylic polymers, cardboard, waxed cardboard, silicone or rubber composites, or other similar materials. In preferred embodiments of the present invention, the apparatus is primarily composed of the same material exhibited in the manufacturing of the tube-shaped container itself.

Additionally, it should be understood that the nozzle (20) of the present invention is preferably available in a wide variety of sizes and shapes, each of which is preferably equipped with an angled tip. The angle of the tip(s) may vary in accordance with their intended application and/or the contents of the tube-shaped container on which the present invention is to be installed. It is envisioned that the present invention is to be sold individual and/or in bundled packages containing five iterations of the nozzle (20) for the apparatus. It should be understood that the present invention is configured for use on any product that is sold in a standard tube-shaped container (caulk tube, sealant tube, etc.) Similarly, it should be understood that the present invention is preferably available in multiple sizes so as to properly function with both pint-sized and quart-sized tube-shaped containers, as well as any conventional or standard-sized tube-shaped container that may become available.

In some embodiments of the present invention, the front end (60) of the present invention may be equipped with a threaded receptacle (70) on which differing nozzles (20) (having differently sized/angled tips (80)) may be affixed. In such embodiments, it should be understood that the nozzle (20) is similarly equipped with threading to mate with the treaded receptacle (70) of the present invention. In lieu of threading, other conventional means of attachment may be employed to affix a nozzle (20) to the front end (60) of the present invention, including, but not limited to clasps, hooks, friction-based male-to-female joint, or other similar mating mechanism. It should be understood that such a threaded receptacle (70) is large enough to fit over and atop the default nozzle and/or nozzle output of the tube-shaped container. Likewise, the nozzle (20) of the present invention must be small enough to still be able to fit within the front of the caulk gun without binding.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A caulk tube replacement top comprising:

a body;

a neck with a straight portion extending from a wide opening at a first end;

the straight portion connecting to a first tapered portion of the neck which tapers at an angle configured to slightly flex plastic and cardboard tube containers;

the first tapered portion of the neck connected to a second tapered portion which further tapers the neck to a front end at a diameter to facilitate seating of rigid metal or metallic-based tube containers;

wherein the angles present in the tapering of the neck facilitate surface-to-surface contact with a tube container;

wherein the second tapered portion terminates at a front end of the body, the front end having a discharge opening connected to a nozzle, the nozzle in turn connected to a tip;

wherein the first tapered portion is linear in slope, narrowing in diameter as it approaches the front end of the body, and the second tapered portion is also linear in slope, narrowing in diameter as it approaches the front end of the body; and wherein the nozzle is configured to fit within the front of a caulk gun.

2. The caulk tube replacement top of claim 1, further comprising:

a top and or bottom adapter ring to seal against the body of a metal caulk tube, essentially transforming the diameter of a metal caulk tube to that of a plastic caulk tube to form an airtight seal.

3. The caulk tube replacement top of claim 1, wherein:

said tip extends from an end of the nozzle opposite the end of the nozzle connected to the body, wherein the tip has an air hole; and wherein the wide opening is configured to surround an output end of a caulk tube.

4. The caulk tube replacement top of claim 1, wherein:

said tip has a vent hole; and the body is configured with the first tapered portion and the second tapered portion to form a compression seal on a caulk tube when the caulk tube replacement top is installed.

5. The caulk tube replacement top of claim 1, wherein:

the first tapered portion and the second tapered portions transition directly and continuously from the wide opening to the front end of the body, narrowing in diameter to form a compression seal on caulk tubes.

6. The caulk tube replacement top of claim 1, wherein:

the straight portion that starts at the wide opening and extends to the first tapered portion provides stability to the caulk tube replacement top after it is installed.

* * * * *